United States Patent Office 3,378,551
Patented Apr. 16, 1968

3,378,551
16β - AMINO - 3β,17α - DIHYDROXYPREGN - 5 - EN-20-ONE 20-KETALS AND ACYL DERIVATIVES THEREOF
Clarence G. Bergstrom, Chicago, Ill., assignor to G. D. Searle & Co., Chicago, Ill., a corporation of Delaware
No Drawing. Filed July 17, 1967, Ser. No. 653,654
11 Claims. (Cl. 260—239.55)

ABSTRACT OF THE DISCLOSURE

16β-amino-3β,17α-dihydroxypregn - 5 - en - 20-one 20-ketals and acyl derivatives thereof useful as pharmacological agents, as exemplified by their central nervous system-stimulant, anti-depressant, hypotensive, analgesic, pepsin-inhibitory, anti-ulcerogenic, anti-bradykinin, anti-inflammatory, anti-bacterial, anti-protozoal, anti-fungal, anti-algal and dicotyledonous seed germination-inhibitory activity. These compounds are prepared by reaction of the corresponding 16α,17α-epoxide with the appropriate amine or, alternatively, by acylation of the amino function followed by reduction of the amide moiety.

---

The present invention is concerned with novel steroidal derivatives characterized by 16β-amino and 20-ketal functions and, more particularly, with 16β-amino-3β,17α-dihydroxypregn-5-en-20-one 20-ketals and acyl derivatives thereof represented by the following structural formula

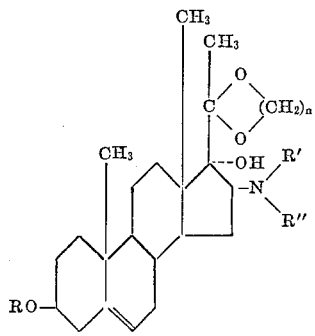

wherein R is hydrogen or a lower alkanoyl or (lower alkoxy)carbonyl radical, R' and R" can be hydrogen or a lower alkyl, lower alkynyl, lower alkenyl, lower cycloalkyl or hydroxy(lower alkyl) radical or R' or R" together with the nitrogen atom comprise a secondary heterocycloaliphaticamino radical and $n$ is a positive integer greater than 1 and less than 4.

The lower alkyl radicals symbolized by R' and R" in the foregoing structural representation are typified by methyl, ethyl, propyl, butyl, pentyl, hexyl, heptyl, and the branched-chain radicals thereof.

The term lower alkoxy embraces radicals of the formula

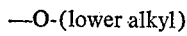
—O-(lower alkyl)

while the term lower alkanoyl comprehends radicals of the formula

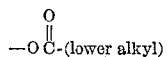
—O $\overset{\text{O}}{\underset{\|}{C}}$-(lower alkyl)

wherein the lower alkyl radicals are as hereinbefore defined.

Examples of the lower alkenyl radicals denoted in that formula are allyl, propenyl and butenyl while the lower alkynyl radicals are typified by propargyl, butynyl, etc.

The heterocycloaliphaticamino radicals indicated in that formula are, for example pyrrolidino, piperidino, morpholino, pipecolino, piperazino, N-alkylpiperazino, trimethylenimino, hexamethylenimino, aziridino, etc.

The term lower cycloalkyl includes, for example, cyclopentyl, cyclohexyl, etc.

The novel compounds of the present invention are conveniently manufactured by processes which utilize as starting materials 16α,17α-epoxides of the following structural formula

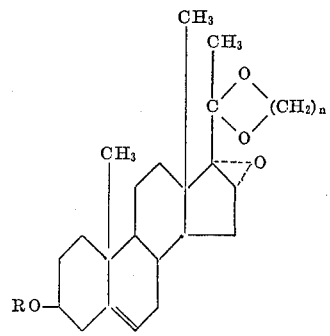

wherein R and $n$ are as hereinbefore defined. When those materials are contacted with the appropriate amine reactant, the instant 16β-amino-17α-hydroxy derivatives are produced. A specific example is the reaction of 3β-acetoxy-16α,17α-epoxypregn-5-en-20-one 20-ethylene ketal with methylamine, thus affording 3β,17α-dihydroxy-16β-methylaminopregn-5-en-20-one 20-ethylene ketal.

A convenient method for production of the N,N-dialkyl compounds of this invention involves the consecutive steps of acylation of the corresponding N-monoalkyl substances with a lower alkanoic acid anhydride or lower alkyl chloroformate and reduction of the resulting amido product. This two-step process is specifically exemplified by the reaction of 3β,17α-dihydroxy-16β-methylaminopregn-5-en-20-one 20-ethylene ketal with acetic anhydride in pyridine to yield 3β-acetoxy-17α-hydroxy-16β-methylacetamidopregn-5 - en - 20 - one 20-ethylene ketal, which is contacted with lithium aluminum hydride in tetrahydrofuran to produce 3β,17α-dihydroxy-16β-N-ethyl-N-methylaminopregn-5-en-20-one 20-ethylene ketal. The use of an alkyl chloroformate is exemplified by the reaction of 3β,17α-dihydroxy-16β-methylaminopregn-5-en-20-one 20-ethylene ketal with ethyl chloroformate in pyridine to afford 16β-N-methylethoxycarbonylamido-3β-ethoxycarbonyloxy-17α-hydroxypregn-5-en-20-one 20-ethylene ketal. Reduction of that urethan, similarly with lithium aluminum hydride in tetrahydrofuran, results in 3β,17α-dihydroxy-16β-dimethylaminopregn - 5-en-20-one 20-ethylene ketal.

Equivalent to the organic bases of this invention are the corresponding non-toxic acid and quaternary salts, for example the citrate, tartrate, maleate, ascorbate, gluconate, lactate, succinate, phosphate, sulfate hydrobromide, hydrochloride, methiodide, ethiodide, methochloride, methobromide, methosulfate, and ethosulfate.

The instant compounds display valuable pharmacological properties. They are central nervous system-affective agents, for example, as is evidenced by their stimulant, anti-depressant and analgesic activity. They are anti-inflammatory agents also in consequence of their ability to inhibit the edema and granuloma formation associated with inflammatory states. In addition, they exhibit hypotensive, pepsin-inhibitory, anti-ulcerogenic and anti-bradykinin properties. These compounds are, moreover, anti-microbial agents as is evidenced by their ability to inhibit the growth of bacteria such as *Bacillus subtilis*, protozoa such as *Tetrahymena gelleii*, algae such as *Chlorella vulgaris* and fungi such as *Candida albicans*. They inhibit also the germination of dicotyledonous seeds.

These substances can be administered in any of a number of conventional pharmaceutical forms and also by conventional routes. For oral administration suitable solid forms are pills, powders, capsules, tablets, and the like and suitable liquid forms are syrups, emulsions, elixers, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the anti-inflammatory activity of 3β,17α-dihydroxy-16β-methylaminopregn-5-en-20-one 20-ethylene ketal, 3β,17α-dihydroxy-16β-morpholinopregn-5-en-20-one 20-ethylene ketal and 3β,17α-dihydroxy-16β-dimethylaminopregn-5-en-20-one 20-ethylene ketal. These compounds were assayed in the rat at intragastrically administered doses of 2–5, 20 and 1–5 mg. per day, respectively, for two successive days and were found effective in inhibiting the granuloma formation induced by the subcutaneous implantation of cotton wads.

The specific assay used is a modification of that disclosed by Dulin, Proc. Soc. Exp. Biol. Med., 90, 115 (1955) and is described as follows:

Male rats weighing 180–220 g. are adrenalectomized and arranged into groups of six animals each. The animals are maintained on 0.86% saline drinking water for the duration of the test and are supplemented with 5% aqueous glucose for the first 24 hours following adrenalectomy. On the day following the operation, 4 cotton dental pellets, with an average weight of approximately 6 mg., are individually implanted in a bilateral position in the pectoral and dorsal lateral neck regions of each rat. The test compound, dissolved or suspended in a saline-wetting agent mixture or in corn oil, is administered, by stomach tube on the day of the pellet implantation and the treatment is repeated on the following day. On the day following the last treatment the rats are sacrificed and the pellets with associated granuloma tissue are carefully dissected, dried and weighed. These weights are compared with those from a group of control animals concurrently treated as above save for omission of the test compound. The test compound is rated active if it causes a significant decrease (P<0.05) in the weight of encapsulated tissue surrounding the cotton pellets.

The invention will appear more fully from the examples which follow. These examples are set forth by way of illustration only and it will be understood that the invention is not to be construed as limited either in spirit or scope by the details contained therein as many modifications both in materials and methods will be apparent from this disclosure to those skilled in the art. In these examples temperatures are given in degrees centigrade (° C.). Quantities are expressed in parts by weight unless otherwise noted.

EXAMPLE 1

A container containing 50 parts of 3β-acetoxy-16α,17α-epoxypregn-5-en-20-one 20-ethylene ketal is cooled to approximately −70° and 300 parts of liquid methylamine is added. The container is sealed and heated at 140–145° at an internal pressure of 830–890 pounds per square inch for about 10 days. At the end of that reaction time the mixture is cooled and removed from the container with the aid of ethanol. The resulting slurry is evaporated to dryness and the residue obtained is recrystallized from acetone-hexane to yield pure 3β,17α-dihydroxy-16β-methylaminopregn - 5-en-20-one 20-ethylene ketal, melting at about 181.5–191°. The material obtained by concentration to dryness of the mother liquor is again recrystallized from acetone-hexane to yield additional product, melting at about 181–191°. The product of this example is represented by the following structural formula

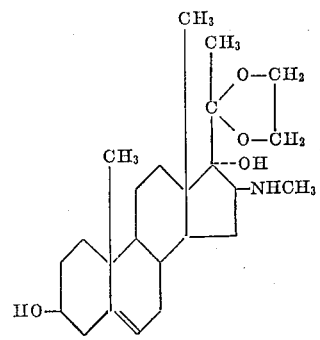

EXAMPLE 2

When an equivalent quantity of ethylamine is substituted in the procedure of Example 1, there is produced 16β-ethylamino-3β,17α-dihydroxypregn-5-en-20-one 20-ethylene ketal.

EXAMPLE 3

A mixture of 20 parts of 3β-acetoxy-16α,17α-epoxypregn-5-en-20-one 20-ethylene ketal and 200 parts of morpholine is heated in a closed container at 175–185° for about 5 days. The container is then cooled to room temperature and the contents are removed with the aid of fresh morpholine. The resulting pale brown solution is filtered and the filtrate is concentrated at reduced pressure to afford a brown syrupy material. Crystallization of that material from aqueous methanol affords the crude product, melting at about 112–115°. Further purification is effected by an additional recrystallization from aqueous methanol, thus affording pure 3β,17α-dihydroxy-16β-morpholinopregn - 5 - en-20-one 20-ethylene ketal, which melts at about 114–117.5° and is represented by the following structural formula

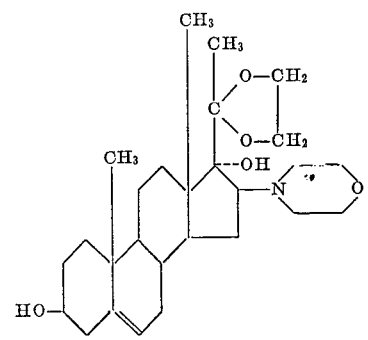

EXAMPLE 4

By substituting an equivalent quantity of pyrrolidine in the procedure of Example 3, there is produced 3β,17α-dihydroxy-16β-pyrrolidinopregn-5-en-20-one 20-ethylene ketal.

EXAMPLE 5

The substitution of an equivalent quantity of piperidine in the procedure of Example 3 results in 3β,17α-dihydroxy-16β-piperidinopregn-5-en-20-one 20-ethylene ketal.

EXAMPLE 6

To a mixture of 20 parts of 3β-acetoxy-16α,17α-epoxypregn-5-en-20-one 20-ethylene ketal with 200 parts by volume of dimethyl sulfoxide, cooled to approximately −70°, is added 140 parts of liquid ammonia and the resulting mixture is heated in a sealed container at approximately 150° and 1200 pounds per square inch pressure for about 5 days. At the end of that time the reaction mixture is cooled and the resulting slurry containing white crystals is poured into approximately 3,000 parts of water. That aqueous mixture is stirred for about 30 minutes and the resulting crude product is collected by filtration. That material, melting at about 149.5–194.5°, is recrystallized from aqueous methanol containing decolorizing carbon to afford the purified product, melting at about 158.5–191.5°. That crude product is partitioned between ethyl acetate and dilute hydrochloric acid. The aqueous phase is separated, neutralized with dilute aqueous sodium hydroxide and filtered in order to isolate the resulting solid crude product. Recrystallization of the latter material several times from aqueous methanol yields pure 16β-amino-3β,17α-dihydroxypregn-5-en-20-one 20-ethylene ketal, which melts at about 210.5–219.5° and is represented by the following structural formula

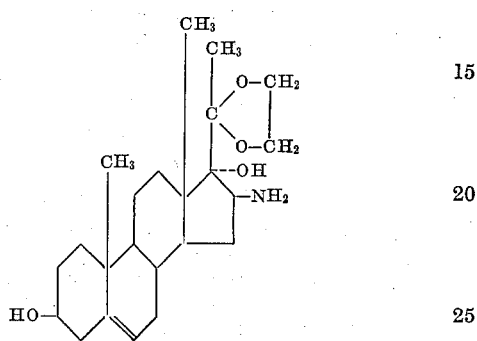

When a solution of the latter amine in ether is mixed with excess isopropanolic hydrogen chloride, there is produced a precipitate, which is purified by recrystallization from methanol-ether to yield 16β-amino-3β,17α-dihydroxypregn-5-en-20-one 20-ethylene ketal hydrochloride hemihydrate, which melts at about 249–250° with decomposition.

EXAMPLE 7

To a solution of 3.83 parts of 3β,17α-dihydroxy-16β-methylaminopregn-5-en-20-one 20-ethylene ketal in 38 parts of pyridine is added dropwise 4.3 parts of ethyl chloroformate. The mixture is externally cooled during the addition in order to control the violent reaction. The reaction mixture is then diluted with approximately 400 parts of water and the resulting yellow suspension is cooled at 0–5° in order to promote crystallization of the product. The yellow solid material thus produced is collected by filtration and recrystallized three times from aqueous acetone to afford pure 16β-N-methylethoxycarbonylamido-3β-ethoxycarbonyloxy-17α-hydroxypregn-5-en-20-one 20-ethylene ketal, melting at about 170–174.5° and represented by the following structural formula

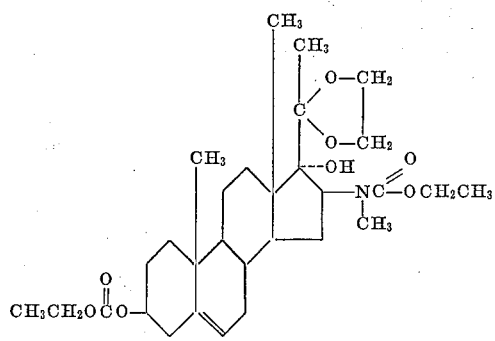

EXAMPLE 8

When an equivalent quantity of n-butyl chloroformate is substituted in the procedure of Example 7, there is produced 16β-N-methyl-n-butoxycarbonylamido-3β-butoxycarbonyloxy-17α-hydroxypregn-5-en-20-one 20-ethylene ketal.

EXAMPLE 9

To a solution of 1 part of 3β,17α-dihydroxy-16β-methylaminopregn-5-en-20-one 20 ethylene ketal in 5 parts of pyridine is added 2 parts of acetic anhydride and the resulting reaction mixture is allowed to stand at room temperature for about 16 hours, then is cooled to 0–5° and diluted with approximately 50 parts of water. The resulting white precipitate is collected by filtration, then twice recrystallized from acetone-hexane to afford pure 3β-acetoxy-17α-hydroxy-16β-N-methylacetamindopregn-5-en-20-one 20-ethylene ketal, melting at about 198.5–207.5°. This compound is represented by the following structural formula

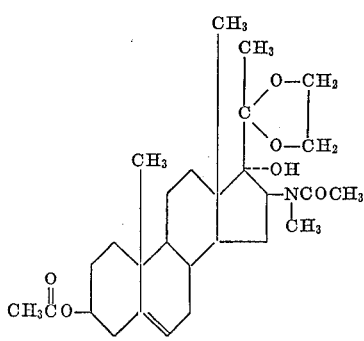

EXAMPLE 10

By substituting an equivalent quantity of propionic anhydride and otherwise proceeding according to the processes described in Example 9, there is obtained 17α-hydroxy-16β-N-methylpropionamido-3β-propionoxypregn-5-en-20-one 20-ethylene ketal.

EXAMPLE 11

To a mixture of 1 part of lithium aluminum hydride with 90 parts of tetrahydrofuran is added cautiously 3.3 parts of 3β-acetoxy-17α-hydroxy-16β-N-methylacetamidopregn-5-en-20-one 20-ethylene ketal, and the resulting reaction mixture is heated at the reflux temperature with stirring for approximately 72 hours. At the end of that time, 80 parts of ethyl acetate is added over a period of about 30 minutes in order to destroy the excess reagent. Saturated aqueous sodium potassium tartrate in the amount of 50 parts by volume is then added and the resulting two phase system is separated. The organic layer is dried over anhydrous sodium sulfate and stripped of solvent by distillation under reduced pressure. The resulting residue is mixed with 7 parts of pyridine and 3.5 parts of acetic anhydride, and that mixture is allowed to stand at room temperature for approximately 24 hours. Precipitation of the acetylated product by dilution with water affords an aqueous suspension, which is extracted with toluene. The organic extract is dried over anhydrous sodium sulfate, then concentrated to dryness under reduced pressure. The remaining solid is dissolved in approximately 175 parts of ether and that organic solution is made acidic by the addition of approximately 15 parts by volume of 1 N hydrochloric acid. The white precipitate is isolated by filtration, then dissolved in approximately 20 parts of methanol and that organic solution is made alkaline by the addition of approximately 10 parts by volume of 10% aqueous sodium hydroxide, then diluted to a total volume of 250 parts with water. Filtration of the mixture affords a crystalline product, which is purified by means of consecutive recrystallization from aqueous methanol, thus producing pure 3β,17α-dihydroxy-16β-N-ethyl-N-methylaminopregn-5-en-20-one 20-ethylene ketal, melting at about 144.5–148.5°. It is represented by the following structural formula

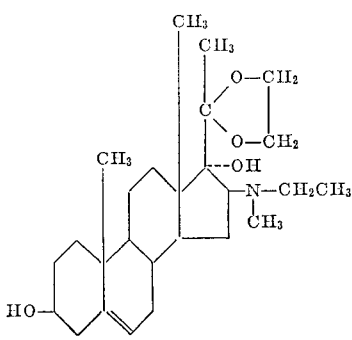

EXAMPLE 12

When an equivalent quantity of 17α-hydroxy-16β-N-methylpropionamido - 3β - propionoxypregn-5-en-20-one 20-ethylene ketal is substituted in the procedure of Example 11, there is produced 3β,17α-dihydroxy-16β-N-n-propyl-N-methylaminopregn - 5 - en-20-one 20-ethylene ketal.

EXAMPLE 13

To a reaction vessel containing 540 parts of tetrahydrofuran is added successively with stirring, while a stream of nitrogen is passed into the reactor, 7.14 parts of lithium aluminum hydride, 7.14 parts of 16β-N-methylethoxycarbonylamido - 3β - ethoxycarbonyloxy-17α-hydroxypregn-5-en-20-one 20-ethylene ketal and 108 parts of tetrahydrofuran. The resulting reaction mixture is heated at the reflux temperature for about 72 hours, at the end of which time approximately 40 parts of ethyl acetate is added in order to destroy the excess reagent. Approximately 100 parts by volume of saturated aqueous sodium potassium tartrate is then added over a period of 10 minutes, resulting in a two-phase system. The organic layer is separated by decantation, then is dried over anhydrous sodium sulfate and stripped of solvent by distillation under reduced pressure. The resulting residue is partitioned between ether and dilute hydrochloric acid, and the white pasty solid which forms is shaken with dilute aqueous sodium hydroxide, then recrystallized from aqueous methanol to afford 3β,17α-dihydroxy - 16β - dimethylaminopregn-5-en-20-one 20-ethylene ketal, melting at about 149.5–163°. Additional product, melting at about 150–161.5°, is obtained by recrystallization from aqueous methanol of the fraction obtained from the mother liquor. The product of this example is represented by the following structural formula

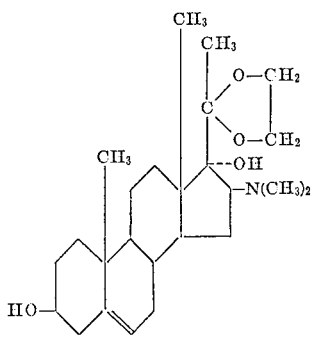

EXAMPLE 14

When an equivalent quantity of 16β-ethylamino-3β,17α-dihydroxypregn-5-en-20-one 20-ethylene ketal is substituted in the procedure of Example 9, there is produced 3β - acetoxy - 16β - N - ethylacetamido - 17α - hydroxypregn-5-en-20-one 20-ethylene ketal.

By substituting an equivalent quantity of 3β-acetoxy-16β - N - ethylacetamido - 17α - hydroxypregn - 5 - en-20-one 20-ethylene ketal and otherwise proceeding according to the processes described in Example 11, there is produced 16β-diethylamino-3β,17α-dihydroxypregn-5-en-20-one 20-ethylene ketal.

EXAMPLE 15

A pale yellow solution containing 1 part of 3β-acetoxy-16α,17α - epoxypregn - 5 - en - 20 - one 20-ethylene ketal and 25.5 parts of ethanolamine is heated at the reflux temperature for about 19 hours, then is concentrated to dryness by distillation under reduced pressure. The residual cream colored solid is slurried with water and collected by filtration. That crude product, melting at about 155–179°, is purified by recrystallization from acetone-hexane to afford crystals of pure 3β,17α-dihydroxy-16β-(2-hydroxyethyl)aminopregn-5-en-20-one 20-ethylene ketal, melting at about 178–188°. This compound is represented by the following structural formula

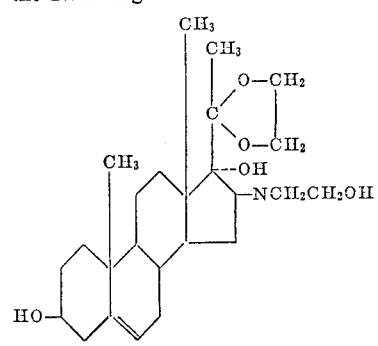

EXAMPLE 16

When an equivalent quantity of 3-hydroxypropylamine is substituted in the procedure of Example 15, there is produced 3β,17α - dihydroxy - 16β - (3 - hydroxypropyl) aminopregn-5-en-20-one 20-ethylene ketal.

What is claimed is:
1. A compound of the formula

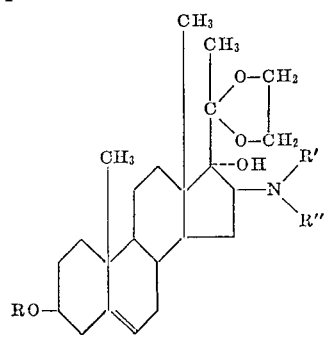

wherein R is selected from the group consisting of hydrogen and lower alkanoyl and (lower alkoxy)carbonyl radicals, R' and R'' are members of the class consisting of hydrogen, lower alkyl, lower alkanoyl, hydroxy(lower alkyl) and (lower alkoxy)carbonyl radicals or R' and R'' together with the nitrogen atom comprise a secondary heterocycloaliphaticamino radical.

2. As in claim 1, a compound of the formula

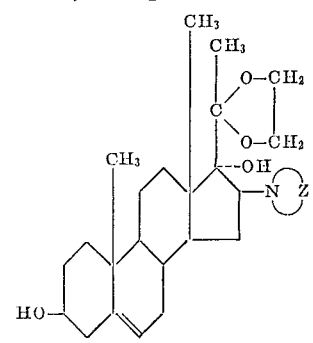

wherein

is a secondary heterocycloaliphaticamino radical.

3. As in claim 1, a compound of the formula

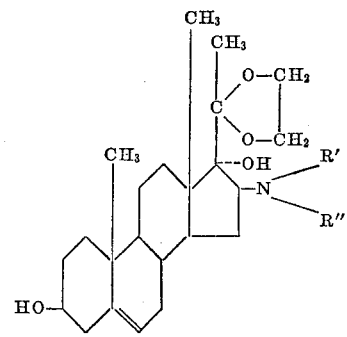

wherein R' and R" are selected from the group consisting of hydrogen and lower alkyl radicals.

4. As in claim 1, a compound of the formula

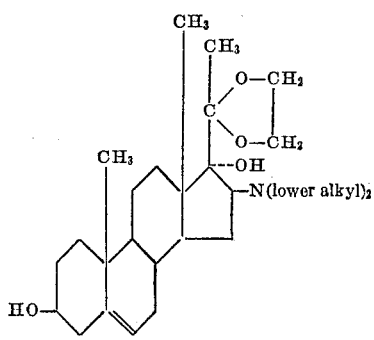

5. As in claim 1, a compound of the formula

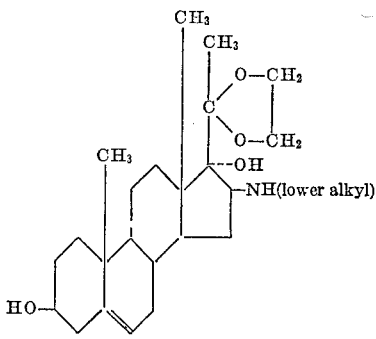

6. As in claim 1, the compound which is 3β,17α-dihydroxy-16β-methylaminopregn-5-en-20-one 20-ethylene ketal.

7. As in claim 1, the compound which is 3β,17α-hydroxy-16β-morpholinopregn-5-en-20-one 20-ethylene ketal.

8. As in claim 1, the compound which is 16β-amino-3β,17α-dihydroxypregn-5-en-20-one 20-ethylene ketal.

9. As in claim 1, the compound which is 3β,17α-dihydroxy-16β-dimethylaminopregn-5-en-20-one 20-ethylene ketal.

10. As in claim 1, the compound which is 3β-acetoxy-17α - hydroxy - 16β - N - methylacetamidopregn - 5 - en-20-one 20-ethylene ketal.

11. As in claim 1, the compound which is 16β-N-methylethoxycarbonylamido - 3β - ethoxycarbonyloxy-17α-hydroxypregn-5-en-20-one 20-ethylene ketal.

References Cited

UNITED STATES PATENTS 3,232,930  2/1966  Bergstrom _____ 260—239.5

LEWIS GOTTS, *Primary Examiner.*

E. G. LOVE, *Assistant Examiner.*